Jan. 6, 1959

G. A. VESPER 2,867,205

STONE SPLITTING MACHINE

Filed Jan. 22, 1957

GEORGE A. VESPER
INVENTOR.
Huebner, Beehler, Worrel & Herzig

BY

ATTORNEYS.

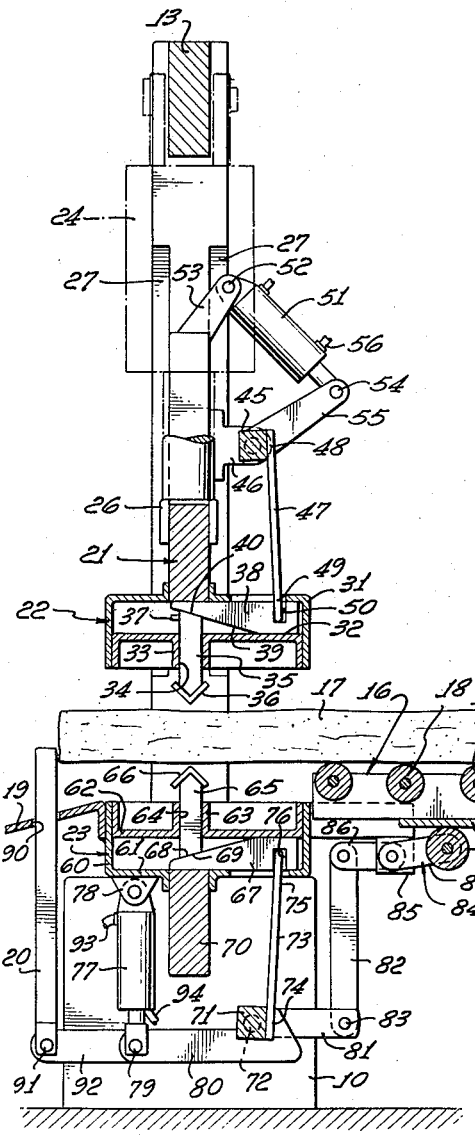

United States Patent Office 2,867,205
Patented Jan. 6, 1959

2,867,205

STONE SPLITTING MACHINE

George A. Vesper, Costa Mesa, Calif.

Application January 22, 1957, Serial No. 635,306

9 Claims. (Cl. 125—23)

The invention relates to stone splitting or cutting machines of a type capable of accepting a slab of stone of virtually any type and splitting or cutting the stone into pieces of measured length by making a relatively clean cut, thereby to produce stone pieces suitable as building materials.

Over a period of many years there has been sundry developments in the fabrication of stone splitting machines which take advantage of the effect of a blow administered through properly aligned teeth to clean stone along some predetermined line, this technique being a very marked advantage from the point of view of time saved over the antiquated sawing methods relied upon many years previously. Moreover, the trend in styles in stone veneer has moved in the direction of roughened surfaces to bring out unique textures and the breaking or cleavage of stones along one line or another has been found highly desirable as a means of producing stone surfaces which have a unique, distinctive and attractive appearance. On the other hand, however, there is some practical limitation with respect to the roughness of surface texture in that such stones need to have a form which will permit them to be laid in place with reasonable rapidity and to fit with respect to somewhat conventional technique in the building of buildings.

Accordingly there has arisen a line of development of stone splitting devices which may be appropriately described as guillotine type machines to the extent that they have made provision for a stationary lower alignment of cutting edges upon which a stone slab can be set whereafter a knife edge is driven downwardly against the stone by some power means which in some instances has been a blow delivered by a descending weight and in other instances has consisted of a power drive motivated by hydraulic power.

Inasmuch as stone slabs are the raw material, it must be appreciated that these slabs of raw material have a very uneven surface against which the cutting edges are to press or to be driven. Hence if a reasonably straight cut is to be accomplished, it has been found desirable to provide some technique whereby individual cutting teeth can find a position and elevation such that each tooth will have a bearing upon a stone surface before the blow is administered so that pressure will be exerted all along the cleavage line as nearly uniform as possible, thereby to avoid cracking or breaking of the stone slab in some undesired direction.

Machines heretofore extant have used one form or another of tooth structure wherein the teeth have been capable of acting individually. In some instances teeth have been pivoted upon a horizontal axis so as to permit them to shift to some appropriate angle depending upon the unevenness of the surface texture. Sockets and moving joints as well as adjustable tooth faces have been tried. In other instances individual hydraulic cylinders have been employed, one for each tooth, in an attempt to permit individual adjustment. On still other occasions coiled springs have been employed, one spring for each tooth, for a similar purpose. When such schemes are resorted to some independent mechanism has been made use of to advance the stone slab to a cutting position to gage the amount of stone to be split off and to perform the other operations dependent upon the over-all process.

While these devices have found favor to a limited degree, they have had certain disadvantages among which has been that of production of considerable waste due to improper fracturing. The means relied upon for independently adjusting the teeth has had some limitations in the splitting of various types of stone. Also these devices have been cumbersome to a degree which has prevented efficient and rapid operation and hence has increased considerably the cost of the finished product produced thereby. Moreover, when a great many individual mechanisms are depended upon, as when a separate hydraulic cylinder is employed for each tooth, the number of separate parts has been legion and this has resulted in an undesirable high first cost as well as troublesome maintenance problems due both to the wearing of the parts and to the fact that the rugged use to which such devices are put causes parts to frequently break down.

It is therefore among the objects of the invention to provide a new and improved stone splitting machine which is substantially all automatic in its operation in that by or from a single control or control panel all of the individual teeth can be separately positioned depending upon the surface of the stone to be cut and thereafter caused to be pressed against the surface with a uniform pressure and driven as a unit through a splitting stroke at virtually the same time.

Another object of the invention is to provide a new and improved substantially all automatic stone splitting machine which is rapid in operation in that the advancing and gaging of the stone size is adapted to take place automatically as the slab is placed in position, the conveyor removed and the cutting teeth adjusted and subsequently driven through the cutting or splitting stroke.

Still another object of the invention is to provide a new and improved stone splitting machine which has a smooth action accompanied by relatively a minimum amount of vibration in the device and which is constructed with a sufficient degree of rugged simplicity to substantially minimize wear and breakage of the moving parts.

A further object of the invention is to provide in a stone splitting device means for individually adjusting each tooth to a position of contact with the roughened surface of the stone but which individual means are actuated by a common actuator and common hydraulic cylinder, thereby to minimize the number of critical and high-priced parts while at the same time producing uniformity and dependability of action.

A further object still is to provide a stone splitting machine wherein a very large proportion of the parts are of rugged and somewhat conventional construction which do not require careful and precise fabrication and machining, thereby being productive of a machine which is dependable, which is inexpensive to fabricate, and which requires a relatively minimum amount of maintenance and periodic replacement of worn parts.

With these and other objects in view, the invention consists in the construction, arrangement and combination of the various parts of the device whereby the objects contemplated are attained, as hereinafter set forth, pointed out in the appended claims and illustrated in the accompanying drawings.

In the drawings:

Figure 1 is a front elevational view of a stone splitting machine incorporating the invention.

Figure 2 is a longitudinal sectional view taken on the line 2—2 of Figure 1.

Figure 3 is a longitudinal sectional view drawn to a somewhat larger scale showing the position of parts of the machine at the point of gaging and immediately prior to the adjustment of the teeth.

Figure 4 is a longitudinal sectional view similar to Figure 3 showing the parts in a position wherein all teeth have been brought into adjusted contact and the machine made ready for the splitting stroke.

In the embodiment of the invention chosen for the purpose of illustration there is shown a frame for the machine constituting in general a base 10, a pair of vertical columns 11 and 12 mounted on the base and spaced from each other, and a yoke 13 extending between the tops of the columns. The base in the example shown has been made substantially wider than the spread of the columns so as to provide a means for mounting a hydraulic or pneumatic pump or compressor 14 adapted to supply power for operation of the machine. A conveyor indicated generally by the reference character 15 is shown located midway between the columns on one side of the frame, the conveyor having a tilting section 16 immediately adjacent the frame. The conveyor is shown supporting a slab 17 of some type of stone and by use of rollers 18 advancing the slab into position within the machine. After a section has been cut from the slab, it is permitted to fall upon a delivery tray 19 by means of which the slab is removed from the cutting operation. A stone gage 20 is employed for limiting the travel of the slab into the machine in order to determine the proper size of the piece of stone which is to split from the slab.

For purposes of description the machine may be described as including a splitting head 21 which moves up and down between the columns 11 and 12 and which carries a movable tooth holder 22. Beneath the splitting head and movable tooth holder is a combination of structural elements which may appropriately be described as a stationary tooth holder 23.

The splitting head is moved up and down by operation of a fluid ram 24 which has a pivotal mounting 25 on the yoke 13 and which has a connection 26 to the splitting head which may permit some limited freedom of motion. Tracks 27 may be employed to guide the movement of the splitting head with respect to the columns 11 and 12. Power for operating the ram 24 is generated by the pump 14 and conducted through pipes 28 and 29 to the ram through an appropriate control panel 30.

The movable tooth holder may be said to comprise a channel section 31 which mounts a tooth-holding web 32. On the web 32 is a series of collars 33, one collar for each tooth. The collar provides a passageway 34 within which is located a tooth 35 having a wearing or cutting edge 36. A small pin 37 may be employed to limit downward movement of the tooth when the splitting head is lifted.

A cam or camming wedge 38 is provided for each tooth. The camming wedge has an oblique cam face 39 which engages a sloping surface 40 at the inner end of the tooth, the camming wedge being mounted so as to slide horizontally on the upper face of the web 32. For actuating each and every one of the camming wedges there is provided an actuator bar 45 extending from one side to the other of the splitting head and rotatably mounted in appropriate brackets 46. In the chosen example the actuator bar consists of a bar which is square in section throughout the portion intermediate the brackets. On the bar is a series of leaf springs 47, one spring for each camming wedge, the spring having an end 48 fixed to one of the square faces of the actuator bar and another end 49 received in a slot or recess 50 in the camming wedge.

In order to rotate the actuator bar 45 and as a consequence simultaneously motivate each and every wedge 38 and its respective tooth 35, there is provided a power ram 51 capable of being actuated by either hydraulic power or air pressure. This ram has one end 52 pivotally mounted upon a bracket 53 on the splitting head 21 and another end 54 pivotally secured to a lever 55 which is affixed to the actuator bar 45. Power for the ram 51 is supplied through fluid lines 56 which emanate in the control panel 30.

The lower or stationary tooth holder 23 is similarly constructed in that there is provided a channel-shaped section 60 having a bottom wall or web 61 and in which there is positioned an intermediate web 62 suitably welded or otherwise affixed at its end to the channel section 60. As previously described in connection with the movable tooth holder, the intermediate web is provided with a series of collars 63, one for each tooth, each collar being provided therein with an aperture 64 in which a tooth 65 is reciprocatably mounted. At the upper end of the tooth 65 is a cutting edge 66. A camming wedge 67, on the upper surface of which is a camway or cam track 68, supports the tooth at the area of engagement, namely, an oblique surface 69. The camming wedge is adapted to slide on its bottom upon the upper surface of the web 61 of the channel section 60. The travel of the wedge is limited in movement toward the right, as viewed in Figures 3 and 4, by the right side wall of the channel and toward the left by the left side wall. The channel section is shown anchored to a transverse beam 70 on the base 10.

For shifting the lower teeth into adjustable engagement with the slab 17 there is provided an actuator bar 71 square in cross-section and rotatably mounted at ends 72 thereof in appropriate bearing mounts 72' in the base. Springs 73 herein identified as leaf springs are provided one for each camming wedge with a lower end 74 of the spring anchored to one face of the actuator bar 71 and an upper end 75 of each received in a slot or recess 76 in the camming wedge. To tilt the actuator bar 72 and hence move the wedges there is provided a power ram 77 adapted to be operated by hydraulic fluid or air pressure, the power ram being pivotally mounted upon a bracket 78 on the underside of the channel section 60. A lower end of the ram is pivotally mounted by means of a pin 79 to a lever 80. The lever in turn is anchored to an adjacent portion of the actuator bar 71. Hence, when the ram is actuated, the left end of the lever, as viewed in Figures 3 and 4, is moved downwardly, causing the actuator bar to rotate counterclockwise which in turn rotates the spring 73 counterclockwise, hence moving the camming wedges 67 from right to left. Movement in this direction serves to cam the teeth 65 upwardly into resilient engagement with appropriate locations on the underside of the slab 17.

In order that no splitting of the slab be restricted, it is desirable to remove the conveyor from supporting engagement with the slab so that the weight of the slab where the splitting is to take place is entirely upon the lower teeth 65. Hence, means is provided in the machine for permitting the tilting section 16 of the conveyor 15 to move downwardly out of this supporting engagement. To accomplish this an extension 81 is formed on the lever 80 and a link 82 is pivotally secured to the extension by means of a pin 83. The lifting and lowering of the tilting section is directly accomplished by the tilting of a rocker 84 which is tiltably mounted about its mid-portion upon a bracket 85, the bracket in turn being carried by the base 10. Connecting the link 82 to an end 86 of the rocker 84 makes it possible to tilt an opposite end 87 which carries a roller 88 so that the roller can be raised and lowered with respect to a shoe 89. As a consequence when the ram 77 moves from the position illustrated in Figure 3 to the position illustrated in Figure 4, the lever 80 is rotated counterclockwise about the axis of the actuator bar 71, causing the lever extension 81 to elevate, thereby to elevate the end 86 of the rocker and depress the end 87 and roller 88. This permits the section 16 to lower by gravity action to a position such as that illustrated in Figure 4 removed from the slab 17. Motion in the opposite direction will of course elevate the scetion 16 to supporting engagement.

As a further incident to the proper placing of a stone slab in position in the machine for splitting the stone gage 20 previously identified is employed. To locate the stone gage there is provided a hole 90 in the tray 19 through which the gage 20 protrudes when in gaging location as shown in Figure 3. The lower end of the gage is pivotally secured by a pin 91 to an arm 92.

Power for manipulating the ram 77 is provided by the same pump 14 previously described and lines 93 and 94 which are connected to the ram emanate from the same control panel 30 and incidentally are interconnected with the lines 56 and 57 which supply the ram 51. Thus interconnected both of the rams 51 and 77 are actuated simultaneously in a direction such that the upper and lower teeth are advanced together against the slab and subsequently released together after the splitting operation has been accomplished.

In the sequence of operations by means of which the slab is advanced and split, it will be appreciated that slabs 17 have previously been either selected or formed to present an approximately desirable depth. The slab 17 to be split is then rolled along the conveyor 15 to a position where it is supported by the rollers 18 of the tilting section 16. The slab is then pushed from right to left, as viewed in Figures 2, 3 and 4, until it strikes against and is held by the stone gage 20. In practice it is found desirable to employ two or more of the gages 20 in order that as each successive split is made off the slab the splits on opposite sides of the split off pieces will be parallel. At this stage of operation fluid is applied to the lower ends of the rams 51 and 77 causing the pistons to be retracted which in turn causes the leaf springs 47 and 73 to be rotated in a direction to remove the respective wedges 38 and 67 to locations farthest removed from engagement with the teeth. Also in this position the ram 20 is actuated in a direction such that the splitting head 21 is elevated. The teeth 35 will hang suspended by engagement of the pins 37 with the web 32. The splitting head can then be lowered until the upper teeth 35 touch the upper face of the slab 17. Thereafter rams 51 and 77 are actuated in the manner already described so as to advance the wedges 38 and 67 into engagement with the teeth. This causes each individual tooth to be spring pressed firmly into engagement with the particular portion of the surface of the slab immediately opposite the tooth. The teeth will move variously because of the unevenness of the surface but the leaf spring action will compensate for the different degrees of advance of the teeth. Once the teeth are properly set by the operation just described, additional power is imparted to the splitting head by actuation of the ram 24 and the pressure exerted gradually by this ram moves the splitting head downwardly forcing the upper teeth 35 down against the slab until a split line occurs between the upper and lower teeth and a piece is broken off at the end of the slab.

In the meantime the section 16 of the conveyor has been removed as has also been the stone gage or gages 20. Consequently all of the pressure exerted is in a line between the teeth and after the piece has been split off at the end of the slab, it will fall upon the tray 19 and slide downwardly to a suitable receptacle or truck.

After the splitting operation has taken place, the parts are returned to the position first described and the slab moved up again until it engages the stone gages 17 for a second and for successive splitting operations.

There has accordingly been described herein a rugged and positive acting stone splitting machine, necessary parts of which are interrelated in the interest of rapid and continued operation with the prospect of positive results.

While I have herein shown and described my invention in what I have conceived to be the most practical and preferred embodiment, it is recognized that departures may be made therefrom within the scope of my invention, which is not to be limited to the details disclosed herein but is to be accorded the full scope of the claims so as to embrace any and all equivalent devices.

Having described my invention, what I claim as new and desire to secure by Letters Patent is:

1. A stone splitting machine comprising a frame having a base, upright columns and a yoke therebetween, and a stone conveyor extending transversely across the frame between said columns, a splitting head having a vertically movable mounting on said columns, a movable tooth holder on the head on one vertical side of said conveyor and a series of separate vertical parallel teeth movably mounted in the holder, a horizontal wedge cam in camming engagement with each tooth, a stationary tooth holder on the frame on another vertical side of said conveyor and a series of vertical parallel teeth movably mounted in the last holder and a horizontal wedge cam mounted independently of other wedge cams and in camming engagement with each respective tooth, a horizontal cam actuator bar rotatably mounted on each holder, a leaf spring for each tooth having one end in horizontal spring pressed engagement with the respective wedge cam and the other end fixed on the respective bar and forming the sole connection between the respective bar and the cams, a fluid powered ram operably connected to each bar and attached to the respective holder and a fluid circuit common to both rams adapted to simultaneously move all said teeth into engagement with the stone.

2. A stone splitting machine comprising a frame having a base, upright columns and a yoke therebetween, and a stone conveyor extending transversely across the frame between said columns, a splitting head having a vertically movable mounting on said columns, a movable tooth holder on the head above said conveyor and a series of separate vertical parallel upper side teeth movably mounted in the holder, a horizontal wedge cam in camming engagement with each tooth, a stationary tooth holder on the frame below said conveyor and a series of vertical parallel lower side teeth movably mounted in the last holder and a horizontal wedge cam in camming engagement with each tooth, a horizontal cam actuator bar rotatably mounted on each holder, a leaf spring for each upper side and lower side tooth having one end in a releasable horizontal spring pressed engagement with the cam and the other end fixed on the respective bar, a lever on each bar, said leaf spring in each instance forming the sole connection between the bar and the cams, a fluid powered ram secured to each lever and attached to the respective holder and a fluid circuit common to both rams adapted to simultaneously move all said teeth into engagement with the stone.

3. A stone splitting machine comprising a frame having a base, upright columns and a yoke therebetween, and a stone conveyor extending transversely across the frame between said columns, a splitting head having a vertically movable mounting on said columns, a movable tooth holder on the head above said conveyor and a series of separate vertical parallel upper side teeth movably mounted in the holder, a horizontal wedge cam in camming engagement with each tooth, a stationary tooth holder on the frame below said conveyor and a series of vertical parallel lower side teeth movably mounted in the last holder and a horizontal wedge cam in camming engagement with each tooth, a horizontal cam actuator bar rotatably mounted on each holder, a leaf spring for each upper side and lower side tooth having one end in horizontal spring pressed engagement with the tooth and the other end fixed on the respective bar, a lever on each bar, a fluid powered ram secured to each lever and attached to the respective holder and a fluid circuit common to both rams adapted to simultaneously move all said teeth into engagement with the stone, an end of said conveyor adjacent the frame having a vertically tilting section, an articulated support for said section connected to the lower actuator bar whereby after advance of the stone to the teeth said tilting section is adapted to be removed from engagement with the stone simultaneously with movement of the lower side teeth into engagement with the stone.

4. A stone splitting machine comprising a frame having a base, upright columns and a yoke therebetween, and a stone conveyor extending transversely across the frame between said columns, a splitting head having a vertically movable mounting on said columns, a movable tooth holder on the head above said conveyor and a series of separate vertical parallel upper side teeth movably mounted in the holder, a horizontal wedge cam in camming engagement with each tooth, a stationary tooth holder on the frame below said conveyor and a series of vertical parallel lower side teeth movably mounted in the last holder and a horizontal wedge cam in camming engagement with each tooth, a horizontal cam actuator bar rotatably mounted on each holder, a leaf spring for each upper side and lower side tooth having one end in horizontal spring pressed engagement with the tooth and the other end fixed on the respective bar, a lever on each bar, a fluid powered ram secured to each lever and attached to the respective holder and a fluid circuit common to both rams adapted to simultaneously move all said teeth into engagement with the stone, an end of said conveyor adjacent the frame having a vertically tilting section, an articulated support for said section connected to the lower actuator bar, a stone gage in alignment with the conveyor retractably mounted on the opposite side of the frame, an articulated connection between said gage and the lower fluid powered ram whereby after advance of the stone to the gage said gage and said tilting section are adapted to be removed from engagement with the stone simultaneously with movement of the lower side teeth into engagement with the stone.

5. In a stone splitting machine having a base, upright columns thereon, and a tooth holder on said machine, the combination of a vertically actuated tooth mechanism mounted on the holder, said mechanism comprising a set of separate parallel teeth mounted in vertically reciprocating position on the holder, a separate individually mounted horizontal cam wedge for each tooth having a cam track in camming engagement with the respective tooth, each wedge having a horizontal retaining track, a horizontal shaft rotatably mounted on the respective holder, means forming a retainer on each wedge and a leaf spring for each wedge having one end in engagement with the respective retainer and the other end secured to one side of said shaft, said spring comprising the sole connection between the shaft and the respective wedge, a lever on said shaft, and a fluid powered ram pivotally secured at one end thereof to the holder and at the other end thereof to the lever whereby to simultaneously force all the teeth into spring pressed engagement with the stones by fluid pressure.

6. In a stone splitting machine having a base, upright columns thereon, a tooth holder on the columns and a tooth holder on the base, and a movable mounting securing one of said holders to the machine, the combination of a vertically actuated tooth mechanism mounted on at least one of the holders, said mechanism comprising a set of separate parallel teeth vertically mounted in the respective holder, a horizontal cam wedge for each tooth having a cam track in camming engagement with the respective tooth, each wedge having a horizontal retaining track, a horizontal square shaft rotatably mounted on the respective holder, means forming a slot in each wedge and a leaf spring for each wedge having one end releasably mounted in the respective slot and the other end secured to one face of said shaft, a lever on said shaft, and a fluid powered ram pivotally secured at one end thereof to the holder and at the other end thereof to the lever whereby to simultaneously force all the teeth into spring pressed engagement with the stones by fluid pressure.

7. In a stone splitting machine having a base, upright columns thereon, and a movable tooth holder on the columns, the combination of a stone conveyor at one side of the base having a vertically tilting conveyor section adjacent the base, a stationary tooth holder on the base beneath the movable tooth holder, said stationary tooth holder comprising a horizontal beam, a plurality of parallel vertical teeth and means reciprocatably mounting said teeth on the beam, a cam wedge for each tooth reciprocatably mounted in transverse position on the beam, each said wedge having an oblique cam face at one end in camming engagement with the respective tooth and having a slot on the opposite end thereof, an actuator bar rotatably mounted on the base and a leaf spring for each wedge having one end secured to the bar and the other end in the slot of the wedge, a conveyor tilting rocker pivotally mounted on the base beneath said conveyor section, one end of said rocker having a member thereon adapted to engage said section, a jointed lever system between the other end of said rocker and said actuator bar, whereby to elevate and depress said conveyor section in response to rotation of the actuator bar, and a fluid powered ram having one end pivotally connected to the base and the other end pivotally connected to the bar whereby to withdraw said conveyor section from engagement with a stone simultaneously with advance of all said teeth into engagement with the stone.

8. In a stone splitting machine having a base, upright columns thereon, and a movable tooth holder on the columns, the combination of a stone conveyor at one side of the base having a vertically tilting conveyor section adjacent the base, a stationary tooth holder on the base beneath the movable tooth holder, said stationary tooth holder comprising a horizontal beam, a plurality of parallel vertical teeth and means reciprocatably mounting said teeth on the beam, a cam wedge for each tooth reciprocatably mounted in transverse position on the beam, each said wedge having an oblique cam face at one end in camming engagement with the respective tooth and having a slot on the opposite end thereof, an actuator bar rotatably mounted on the base and a leaf spring for each wedge having one end secured to the bar and the other end in the slot of the wedge, a stone gage comprising a rod extending from the base into the path of the conveyor on the opposite side of the base therefrom, a lever connected between said roll and said actuator bar, and a fluid powered ram having one end pivotally connected to the base and the other end pivotally connected to the lever whereby to withdraw said gage from engagement with a stone simultaneously with advance of all said teeth into engagement with the stone.

9. In a stone splitting machine having a base, upright columns thereon, and a movable tooth holder on the columns, the combination of a stone conveyor at one side of the base having a vertically tilting conveyor section adjacent the base, a stationary tooth holder on the base beneath the movable tooth holder, said stationary tooth holder comprising a horizontal beam, a plurality of parallel vertical teeth and means reciprocatably mounting said teeth on the beam, a cam wedge for each tooth reciprocatably mounted in transverse position on the beam, each said wedge having an oblique cam face at one end in camming engagement with the respective tooth and having a slot on the opposite end thereof, an actuator bar rotatably mounted on the base and a leaf spring for each wedge having one end secured to the bar and the other end in the slot of the wedge, a conveyor tilting rocker pivotally mounted on the base beneath said conveyor section, one end of said rocker having a roller thereon adapted to engage said section, a jointed lever system between the other end of said rocker and said actuator bar, whereby to elevate and depress said conveyor section in response to rotation of the actuator bar, a stone gage comprising a rod extending from the base into the path of the conveyor on the opposite side of the base therefrom, a lever connected between said rod and said actuator bar, and a fluid powered ram having one end pivotally connected to the base and the other end pivotally connected to the lever whereby to withdraw said gage and said conveyor section from engagement with a stone simultaneously with advance of all said teeth into engagement with the stone.

References Cited in the file of this patent
UNITED STATES PATENTS

| | | |
|---|---|---|
| 2,552,958 | Graham et al. | May 15, 1951 |
| 2,762,359 | Entz | Sept. 11, 1956 |
| 2,768,620 | Jenkins et al. | Oct. 30, 1956 |